(No Model.)
A. J. B. BERGER.
ENDLESS CONVEYER.
No. 534,808. Patented Feb. 26, 1895.
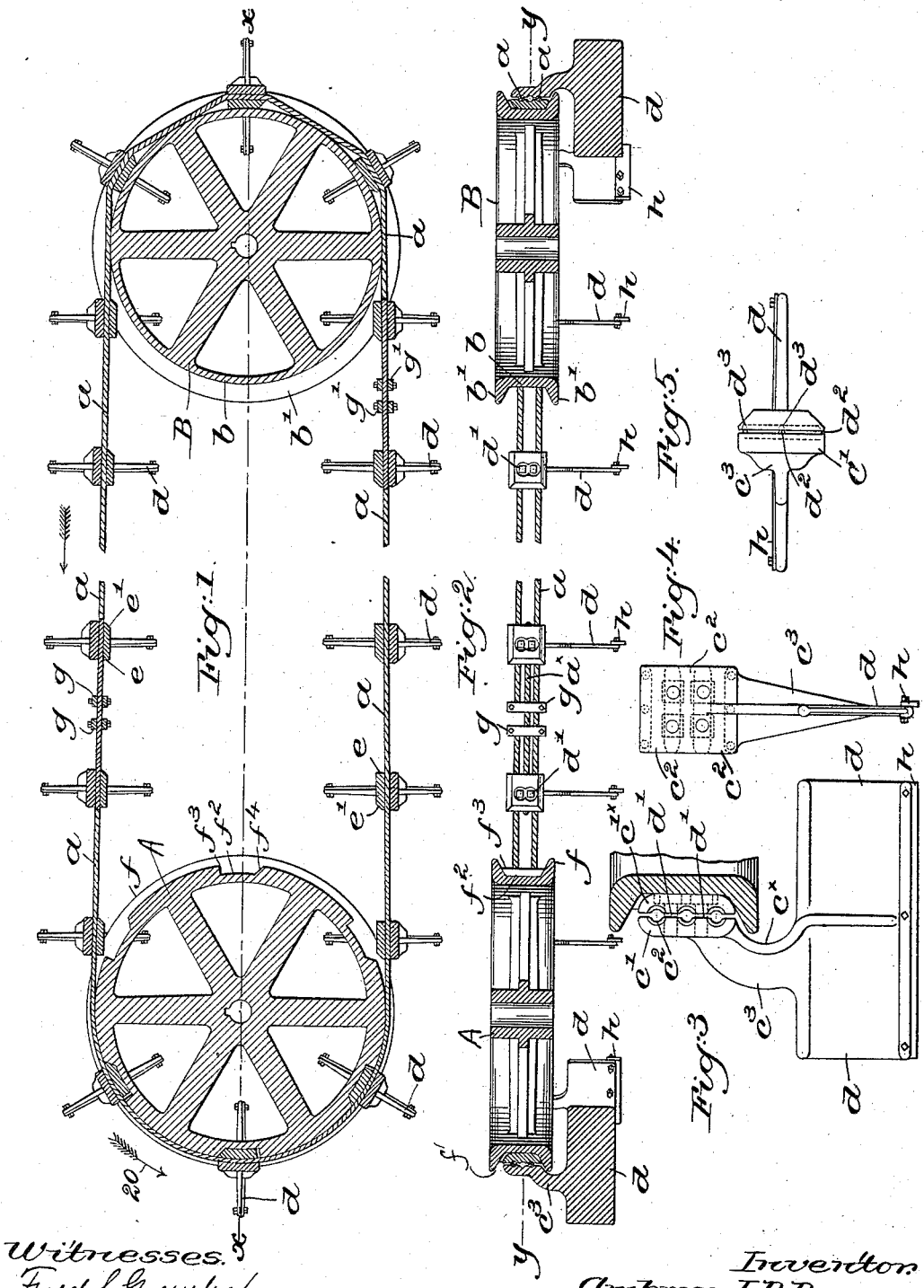
Witnesses.
Fred S. Greenleaf
Thomas J. Drummond
Inventor
Ambrose J. B. Berger
by Crosby & Gregory
attys.

UNITED STATES PATENT OFFICE.

AMBROSE J. B. BERGER, OF HINGHAM, MASSACHUSETTS, ASSIGNOR TO THE STEEL CABLE ENGINEERING COMPANY, OF MAINE.

ENDLESS CONVEYER.

SPECIFICATION forming part of Letters Patent No. 534,808, dated February 26, 1895.

Application filed November 15, 1893. Serial No. 490,976. (No model.)

*To all whom it may concern:*

Be it known that I, AMBROSE J. B. BERGER, of Hingham, county of Plymouth, State of Massachusetts, have invented an Improvement in Endless Conveyers, of which the following description, in connection with the accompanying drawings, is a specification, like letters and figures on the drawings representing like parts.

This invention has for its object the production of an endless conveyer of simple construction and efficient operation and consists in the particular construction and arrangement of parts as hereinafter described.

In accordance therewith my invention consists in an endless conveyer, having its path in a horizontal plane, a driving wheel having its periphery provided with a series of pockets or depressions, a lateral flight support adjacent to and at the under side of each pocket, and a guide wheel, combined with a continuous conveyer, a series of flights, outwardly and downwardly curved connections between said flights and the conveyer, whereby said flights are sustained wholly at one side of said conveyer and wheels, and projections on the conveyer to be engaged and driven by said pockets, substantially as will be described.

Other features of my invention will be hereinafter described and particularly pointed out in the claims.

Figure 1, is a sectional view taken on the line $y$—$y$, Fig. 2, of an endless conveyer embodying my invention, and is broken out to save space on the drawings. Fig. 2, is a vertical section thereof taken on the line $x$—$x$ Fig. 1. Fig. 3, is a side elevation of one of the flights with a portion of the actuating wheel in section. Fig. 4, is an end elevation; and Fig. 5, a top or plan view of one of the flights.

I have herein shown my invention as applied to a conveyer in which the plane of travel is horizontal, the conveyer itself consisting, as shown in Figs. 1 and 2, of parallel cables or ropes $a$ passing around a driving wheel or drum A to be more particularly described, the other end of the conveyer, being extended around the drum B, having a smooth tread $b$ and flanges $b'$, the inner edges of the flanges extending outwardly, as best shown in Fig. 2.

The cables are maintained parallel throughout their length by means of a series of clamps which also form carriers for the flights $d$, the said clamps consisting, as best shown in Figs. 3, 4 and 5, of a base $c'$ provided with a series of parallel depressions $c^2$, herein shown as three in number, and in the outermost depressions the cables $a$ are secured, as will be described.

An arm or projection $c^3$, preferably integral with the carrier base $c'$, extends therefrom at one side, as clearly shown in Fig. 3, to which arm is attached the flight $d$, and the arm $c^3$ is of such length that the flight is held a considerable distance beyond the side of the driving or guide wheels A and B, and in order to extend the arms over and beyond the flanges without notching the latter I have curved the inner face of the bar $c^3$ at $c^\times$, the adjacent flange extending into said curved part as will be seen.

The base $c'$ is placed upon the outer side of the parallel cables and the latter are firmly clamped in place, and the flights thereby held at the desired intervals upon said cables by the clamping piece $c'^\times$, it having upon its inner face three depressions or grooves corresponding to the grooves $c^2$. The clamping pieces $c'^\times$ are held in place on the carrier base $c'$ to tightly clamp the cables by means of bolts $d'$ extended through suitable holes in the two parts. To aid in positioning said parts, one with relation to another, I have shown one part as provided with a series of projections $d^2$ to fit into corresponding depressions $d^3$ in the other part, so that the two parts will always preserve their proper positions when clamped upon the cable.

The outer side of the clamping pieces $c'^\times$ are flat and constitute the bearing surfaces therefor, the front or leading edge $e$ of said plates being substantially at right angles thereto, whereas the rear edges $e'$ are inclined, as best shown in Figs. 1 and 2, to correspond to the depressions in the driving wheel or sprocket A now to be described.

The periphery of the driving wheel is herein shown as provided with pockets or depressions $f^2$, the leading end of said pockets, as $f^3$, being substantially at right angles to the bottom of the pocket, while the rear or driving end $f^4$ is outwardly inclined as shown, and to provide a lateral support for the continuous conveyer adjacent to each pocket, I have herein shown side flanges $f$ having outwardly flaring inner sides $f'$ extended along the edges of the wheel periphery.

While I have herein shown two flanges, it is evident from an inspection of Fig. 2, that the upper one of said flanges may be dispensed with entirely as the flights $d$ are supported in the trough or chute, not shown, and the lower flange $f$ is ample to retain and guide the conveyer in its motion.

It is most convenient to form the flanges as extending around the wheel continuously, but it is evident a series of lips or other flanges adjacent would answer every purpose, as the portions of the flanges opposite the pockets alone have any function in guiding the conveyer and its flights. The pockets thus receive the clamping pieces $c'^\times$ and rotation of the wheel A in the direction of the arrow 20, see Fig. 1, imparts motion to the conveyer, the inclined ends $f^4$ of the pockets bearing against the similarly inclined edges $e'$ of the clamping plates as they enter the pockets one by one and forcing them forward in the direction of rotation.

By making the leading edge of the clamping piece and the leading end of the pocket at right angles to the direction of rotation, I obtain an easier entrance of the clamping pieces into the pockets as the wheel or sprocket revolves, and also obviate any tendency which the pockets would otherwise have to hold the pieces $c'^\times$ as they leave the periphery of the wheel.

In the various forms of sprocket wheels known to me, the rear end of the pocket or recess is substantially parallel to the leading end and at right angles to the bottom of the pocket, or both ends are oppositely inclined, so that when the co-operating part of the conveyer which enters the pocket is about to leave it, it is caught up and slightly twisted before being released, and the conveyer is subjected to considerable strain at constantly recurring intervals to forcibly draw out the engaging parts from such pockets or recesses. This I entirely obviate by making the rear end of the pocket and the rear edge of the engaging part of the conveyer inclined, as described, so that the conveyer is never pulled out of a plane tangent to the periphery of the sprocket or driving wheel. The entrance of the engaging parts into the pockets is also facilitated by the form which I have given them, as there is no crowding down of said parts into the pockets, and the power is applied gradually to the engaging parts of the conveyer by the inclined end of the pocket.

The periphery of the drum B is shown herein as smooth and continuous as it is not necessary to have pockets in said drum, it merely answering as a guide and support for the conveyer. It will be noticed that the flights are very broad and are offset from the continuous conveyer extending well in toward the axis of rotation of the wheels A and B, whereby the increase of conveying surface is obtained, and it is possible to thus increase the size of the flights by using the curved bars $c^3$ which connect them to the carrier bases $c'$. These flights are preferably made of sheet iron and are attached to the arms in any suitable manner. The flights are readily adjustable upon the conveyer cables, and in case of breakage may be easily removed and a new one applied.

The ends of the cables $a$ are not spliced as is now common, but instead thereof, I secure the ends by clamps $g, g$, interposed, as herein shown, between two of the flights, the ends, as 1, of one of the cables $a$ being held in adjacent clamps as shown in Fig. 2, the ends of the other cable being secured in similar clamps $g'$, $g'$ located between two other flights and preferably at a distance from the clamps $g, g$.

In order to preserve the strength of the conveyer, parallelism of the cables, and to hold them rigid, I extend a short length of cable $a^\times$ through the clamps $g$ or $g'$, as the case may be, to the adjacent flights, and extend the ends into the central groove or recess in the carrier base and clamping piece $c'^\times$, so that there is no possibility for the cable to twist, and the conveyer is just as strong at the ends of the cables $a$ as at any other point therein.

If desired, the length of cable $a^\times$ may be extended to the second flight on each side of the clamps $g$ or $g'$, and additional clamps similar to $g$ or $g'$ may be secured on the cables if desired. The specific construction and arrangement of such clamps is not shown or claimed herein, they forming a part of the subject matter of another application filed by me September 17, 1892, Serial No. 446,199.

As the flights are used in connection with troughs having generally a metallic bottom, the wear of such bottom upon the lower edges of the flights is very great and the resulting noise is disagreeable, and in order to overcome the rapid wear and do away with the noise to a very great extent, I have provided the lower edges of the flights with a non-metallic shoe $h$ as shown in Figs. 3 and 4, said shoe consisting preferably of a bar of wood or other suitable material extended across the lower edge of the flight and preferably secured thereto at its rear side by bolts, the shoe being subjected to but little strain, as the flight itself takes up the weight of the main body of the material to be conveyed, the shoe merely serving as a supporting surface to rest upon the bottom of the chute or trough which may be used to prevent the rapid wearing out of the flights, and also do away with the scraping noise, the shoes being easily removed and replaced with new ones when worn out.

I claim—

1. In an endless conveyer having its path in a horizontal plane, a driving wheel having its periphery provided with a series of pockets or depressions, a lateral flight support adjacent to and at the under side of each pocket, and a guide wheel, combined with a continuous conveyer, a series of flights, outwardly and downwardly curved connections between said flights and the conveyer, whereby said flights are sustained wholly at one side of said conveyer and wheels, and projections on the conveyer to be engaged and driven by said pockets, substantially as described.

2. In an endless conveyer, a driving wheel having its periphery provided with a series of pockets or depressions and lateral supports or flanges adjacent to and forming the sides thereof, and a guide wheel, combined with a continuous conveyer, a series of carriers secured thereto, an arm on and laterally extended from each carrier, a flight secured to each arm; and offset at one side, of the path of the conveyer and projections formed by the bases of the carriers to be engaged and driven by the pockets, substantially as described.

3. In an endless conveyer, a driving and a guide wheel, combined with a continuous two cable conveyer supported and driven thereby, a series of flights carried by said conveyer, and clamps located between two adjacent flights and secured to the ends of one cable and to another intermediate its ends, the ends of the latter cable being secured by a second set of clamps on the first cable substantially as described.

4. In an endless conveyer, driving and guide wheels provided with lateral flight supports, combined with a continuous conveyer, a series of two-part flight carriers clamped thereto and each provided with a curved arm adapted to extend over beyond the flight supports, and flights secured to the arms to travel in a path parallel to and at one side of the conveyer, substantially as described.

5. In an endless conveyer, a plurality of cables, and flight carriers having a plurality of grooves clamped thereto, combined with clamps secured to the adjacent ends of one cable and to another between its ends, and an auxiliary short length of cable extending across the joint and clamped at each end, substantially as described.

In testimony whereof I have signed my name to this specification in the presence of two subscribing witnesses.

AMBROSE J. B. BERGER.

Witnesses:
JOHN C. EDWARDS,
GEO. W. GREGORY.